March 10, 1959
J. MERCIER
2,876,799
SEALING MEANS FOR A SLIDABLE MEMBER IN A PRESSURE UNIT
Filed Dec. 23, 1954
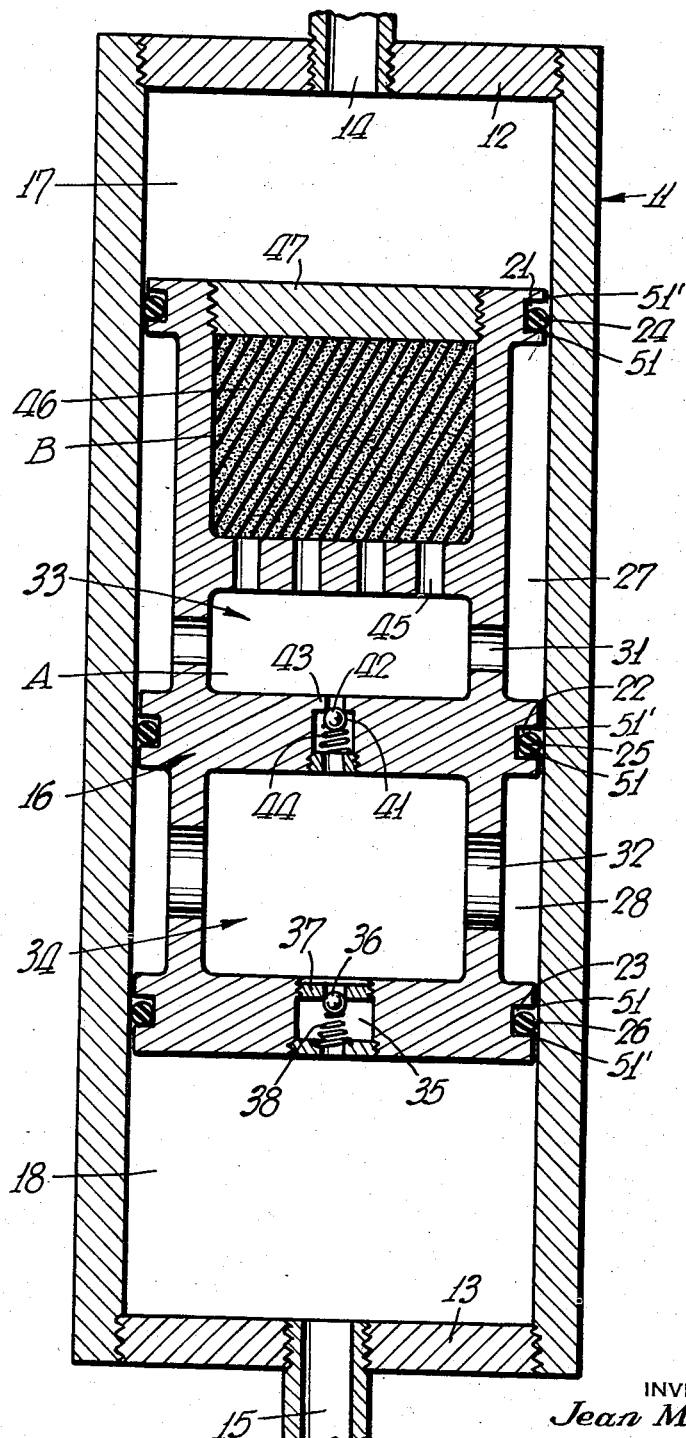
INVENTOR
Jean Mercier
BY
Dean Fairbank + Hirsch
ATTORNEYS

United States Patent Office 2,876,799
Patented Mar. 10, 1959

2,876,799

SEALING MEANS FOR A SLIDABLE MEMBER IN A PRESSURE UNIT

Jean Mercier, New York, N. Y.

Application December 23, 1954, Serial No. 477,218

Claims priority, application France July 31, 1954

6 Claims. (Cl. 138—31)

This invention relates to the sealing means for a slidable member in a pressure unit and more particularly to sealing means including resilient ring type seals for the piston of a piston accumulator.

As conducive to an understanding of the invention, it is noted that where a pressure accumulator has a piston slidably mounted in a cylindrical container to define an oil chamber and a gas chamber on opposed sides thereof and oil leaks into the gas chamber, the capacity of the gas chamber will be correspondingly reduced with resultant reduction in the efficiency of the unit. Furthermore, if gas should leak into the oil chamber and such gas should enter the hydraulic unit operated by the accumulator, such as, for example, a hydraulic brake, the latter may not function properly with resultant harmful consequences.

Where a single resilient ring type seal, such as an O ring, encompasses the periphery of the piston to form a seal, the effectiveness of such seal is poor when the pressure on opposed sides of the O ring is identical, for such seal only operates effectively when there is greater pressure on one side than the other.

Where two O rings are used, for example, for the periphery of the piston of a pressure accumulator, on each side of an annular groove, as the piston moves during normal use of the accumulator, the pressure in the groove between the O rings will rise, due to the wiping action of the O rings on the oil film adhering to the wall of the container which forces oil into the groove, and due to slight leakage past the O rings. If such pressure, which is applied to the adjacent sides of the two O rings, should increase to an amount equal to the pressure on the other sides of both of the O rings, no dependable seal will be afforded between the two chambers defined in the accumulator by the piston. Furthermore, if the pressure in the groove should increase to an amount considerably above that in the chambers, extrusion of the O rings and injury thereto will occur.

Where valve means are associated with the groove between the two O rings to relieve the pressure therein when it has attained a predetermined amount, to prevent extrusion, and once this has occurred, the groove remains charged with oil and further movement of the piston causes oil to leak into the gas chamber, the effectiveness of the accumulator is reduced due to the leakage of such oil into the gas chamber as it reduces the capacity of the latter.

Where there is a difference between the pressure on opposed sides of an O ring and these pressures should reverse, at the moment when both pressures are equal, the sealing effect will be poor.

It is accordingly among the objects of the invention to provide an accumulator of the type having a piston with associated O ring seals which is simple in construction, yet is durable and not likely to become deranged even with long use and which is so designed that at substantially all times in normal operation of the unit, a dependable seal will be provided between the oil and gas chambers which will substantially preclude leakage of fluid under pressure from one chamber to the other and which will prevent extrusion and injury to the O rings by relieving the pressure thereagainst.

According to the invention from its broader aspects, the piston of a piston accumulator has at least three spaced resilient seals such as O rings around its periphery, each positioned in an associated annular groove. The space between the O ring adjacent the gas chamber of the accumulator and the intermediate O ring is in communication, by means of a passageway normally closed by a one-way valve with the space between the intermediate O ring and the O ring adjacent the oil chamber and said latter space is in communication with the oil chamber by means of a passageway, also normally closed by a one-way valve, said valves permitting flow in direction from the first space into the second space and from the second space into the oil chamber.

According to a specific embodiment of the invention, each of the passageways includes a cavity or chamber and the chamber adjacent the gas chamber has a compressible material therein.

This application is a continuation-in-part of copending application Serial No. 405,581, filed January 22, 1954.

In the single figure is shown a longitudinal cross sectional view of a piston accumulator according to the invention.

Referring now to the drawings, the pressure accumulator illustratively shown comprises a substantially cylindrical container 11 which may have plugs 12 and 13 screwed into its respective ends, said plugs having a gas inlet port 14 and a fluid port 15 respectively.

Slidably mounted in the container 11 is a piston 16 defining a gas chamber 17 and a fluid chamber 18 in communication with the ports 14 and 15 respectively. The piston has three spaced annular grooves 21, 22 and 23 in its periphery in each of which is positioned a resilient sealing member, preferably O rings, 24, 25 and 26 respectively, to provide a seal between the piston and the inner surface of the container. In addition, the piston has two elongated annular grooves 27 and 28 positioned between grooves 21, 22, and 22, 23 respectively.

The grooves 27 and 28 are in communication respectively, through associated passageways 31 and 32 with cavities or chambers 33 and 34 in the piston. The chamber 34 is in communication with chamber 18 through a passageway 35 which is normally closed by a ball 36 retained against a seat 37 by a spring 38 to permit flow only in direction from chamber 34 into chamber 18. The chambers 33 and 34 are in communication through a passageway 41 which is normally closed by a ball 42 retained against its seat 43 by a spring 44 to permit flow only in direction from chamber 33 into chamber 34.

The chamber 33 desirably has two sections A and B in communication through passageways 45 and a compressible material such as a mass of foam rubber 46 is positioned in section B of chamber 33, the latter desirably being closed by a removable plug 47.

Before the chambers 17 and 18 are charged, the pressure in such chambers and in annular grooves 27 and 28 and chambers 33 and 34 will be atmospheric. When chambers 17 and 18 are charged, for example, with gas and oil under pressure, as the pressure in grooves 27 and 28 and chambers 33 and 34 is still atmospheric, the intermediate O ring 25 will be subjected to the same or atmospheric pressure on opposed sides, and its efficiency as a seal will be relatively low. However, there will be a differential between the pressure on opposed sides of the O rings 24 and 26 and consequently they will be forced toward each other wedging into the slight space 51 between the wall of container 11 and the periphery of the piston 16 to provide a dependable seal. Thus, there will be substantially no leakage of fluid from chambers 17 and 18.

In use of the unit, a valve (not shown) controlling the oil port 15 is opened. As a result, the pressure in chamber 18 will drop and by reason of the greater pressure in chamber 17, the piston will move downwardly from the position shown in the drawing, forcing oil from chamber 18.

As a result of such movement of the piston 16, oil adhering to the side of the container 11 will be wiped by the O ring 25 and will accumulate in groove 28 and chamber 34 and the oil wiped by O ring 24 will accumulate in groove 27 and chamber 33. In addition, oil adhering to the container wall may leak past O ring 26 into groove 28 and chamber 34 and a slight amount of gas may leak past O ring 24 into groove 27 and chamber 33.

However, due to the sealing action of the O rings and the presence of the chambers 33 and 34 which collect the slight amount of gas and oil that seep by the O rings, there will be no flow of fluid between chamber 17 and 18. As more oil will initially leak into chamber 34 than into chamber 33, although the pressure in both such chambers and the associated grooves 28 and 27 will rise, due to the compression of the gas therein, the pressure in groove 28 and chamber 34 will be greater as they fill more rapidly. Hence the O ring 25 will become wedged into the space 51' associated with groove 22 to provide a dependable seal at such point.

As long as the pressure in groove 28 remains below that in chamber 18; and the pressure in groove 27 is less than that in groove 28 and less than that in chamber 17, the O rings 24, 26 will wedge into the associated space 51 of grooves 21 and 23 and the O ring 25 will wedge into the space 51' of groove 22, to provide dependable seals.

If the piston 16 is operating between the end plugs 12 and 13 and the pressure in groove 28 and chamber 34 rises with operation of the unit as previously described, to a value that is substantially equal to the pressure in chamber 18, the efficacy of the O ring 26 as a seal will be substantially reduced as the pressure on its opposed sides will be substantially equal. However, as long as the pressure in groove 27 is less than that in groove 28, the O ring 25 will provide a dependable seal and as long as the pressure in groove 27 is less than that in chamber 17 the O ring 24 will also provide a dependable seal.

If the pressure in groove 28 and chamber 34 should rise to a value that exceeds the pressure in chamber 18, as soon as such pressure is sufficient to overcome the force exerted by spring 38 the ball 36 will be moved off its seat for relief of the pressure in groove 28 and chamber 34. Thus, there is no danger of extrusion of O ring 26 with possible injury thereto.

At this time the pressure in groove 28 would be greater than that in chamber 18 by an amount related to the force of spring 38 and hence the O ring 26 would move to wedge in the space 51' of groove 23 to again provide a dependable seal.

Further movement of the piston 16 will cause the groove 27 and chamber 33 to fill with oil by reason of the wiping action of O ring 25. When the pressure in groove 27 and chamber 33 has reached a value substantially equal to the pressure in groove 28 and chamber 34, the efficacy of O ring 25 as a seal will also be substantially reduced as the pressure on its opposed sides will be substantially equal. However, at such time, as will be previously described, O ring 26 has been forced into the space 51' of groove 23 to provide dependable sealing action.

When the pressure in chamber 33 rises above that in chamber 34 by an amount related to the force of spring 44, ball 42 will be moved off its seat 43 and fluid will flow from chamber 33 into chamber 34 and as chamber 34 has already been fully charged, the same quantity of fluid forced into chamber 34 will be discharged therefrom into chamber 18.

When the pressure in chamber 33 exceeded that in chamber 34, the O ring 25 shifted to wedge into the space 51 of groove 22 to provide a dependable seal which is in addition to the seal provided by O ring 26.

At this time, the pressure in chamber 34 is greater than that in chamber 18 by an amount related to the force of spring 38; the pressure in chamber 33 is greater than that in chamber 34 by an amount related to the force of spring 44 and the pressures in chambers 17 and 18 are substantially the same.

Consequently, the pressure in chamber 33 will be greater than that in chamber 17 and the O ring 24 will be shifted to wedge into the space 51' of groove 21 to provide a dependable seal.

When the pressure in chamber 33 was substantially equal to that of chamber 17, the efficacy of O ring 24 as a seal was substantially reduced. However, at such time the O ring 26 still provided a dependable seal.

Further operation of the piston 16, without bottoming against plug 13, will cause oil to seep into chambers 33 and 34. However, as such chambers are fully charged, such oil will cause the pressure in the associated chamber to rise and a corresponding amount of oil will flow from chamber 33 into chamber 34 and from chamber 34 into chamber 18.

If the pressure in chamber 18 should drop to atmospheric pressure, such as occurs when the piston 16 bottoms against plug 13, the pressure built up in chamber 34 (assuming that it is sufficient to overcome the force of spring 38) will cause ball 36 to move off its seat for discharge of fluid from such chamber into chamber 18. As the pressure in chamber 34 will drop to a value determined by the force of spring 38, the pressure in chamber 33, if sufficient to overcome the force exerted by spring 44, and the pressure in chamber 34, will cause ball 42 to move off its seat for discharge of fluid from chamber 33 into chamber 34 and a corresponding quantity of fluid will be discharged from chamber 34 into chamber 18.

At such time the pressure in chamber 18 will be less than that in chamber 34 and the O ring 26 will remain wedged into the space 51' of groove 23; the pressure in chamber 34 will be less than that in chamber 33 and the O ring 25 will remain wedged into the space 51 of groove 22 and the pressure in chamber 33 will be less than that in chamber 17 and O ring 24 will move into the space 51' of groove 21.

The operation of the unit after subsequent recharging of chamber 18, due to changes in the pressure on the O rings will be readily apparent in view of the foregoing.

For the short interval of time that the pressure in chamber 33 equals that in chamber 17, the efficacy of O ring 24 is substantially reduced and leakage may occur of oil from chamber 33 into gas chamber 17.

By reason of the compressible mass 46 in section B of chamber 33, equalization of the pressures in chambers 17 and 33 will only occur, if at all, after long periods of operation. Thus, the mass 46 will be compressed as the pressure in chamber 33 rises and each time piston 16 bottoms against plug 13, the mass 46 will expand to force liquid from chamber 33. As a result, it is unlikely that the chamber 33 will ever fill with liquid during normal use of the unit and hence it is not likely that the pressure in chamber 33 will reach the pressure in chamber 17 which would permit leakage past O ring 24.

If not for such compressible mass 46, chamber 33 would fill with liquid and hence after piston 16 once bottomed, as the chamber 33 would normally be filled, only a slight additional quantity of liquid would be required to cause the pressure in chamber 33 to rise to equal that in chamber 17 so that the efficacy of O ring 24 as a seal would be substantially reduced.

With the unit above described involving the use of a plurality of O rings and successive discharge of fluid from chamber to chamber, there is at least one O ring subject to a differential pressure to provide a dependable seal at all times during normal operation.

As many changes could be made in the above construction, and many apparently widely different embodiments of this invention could be made without departing from the scope of the claims, it is intended that all matter contained in the above description or shown in the accompanying drawing shall be interpreted as illustrative and not in a limiting sense.

Having thus described my invention, what I claim as new and desire to secure by Letters Patent of the United States is:

1. A unit of the character described comprising a container having a pair of fluid ports, a piston slidably mounted in said container between said ports and defining a chamber on each side thereof in communication respectively with said ports, said piston having three longitudinally spaced annular peripheral grooves and a first and second additional annular groove located respectively between the first and second and second and third longitudinally spaced grooves, each of said three longitudinally spaced grooves having a resilient seal ring therein, said piston having passageways providing communication between said first and second additional annular grooves and said second additional annular groove and the adjacent chamber, and a one-way valve in each of said passageways permitting flow only from said first additional annular groove to the second additional annular groove and from the second additional annular groove into said adjacent chamber.

2. The combination set forth in claim 1 in which a compressible unit is positioned in said piston and one of the additional annular grooves is in communication with said compressible unit.

3. The combination set forth in claim 2 in which the compressible unit is a mass of foam rubber.

4. A unit of the character described comprising a container having a gas port and a liquid port, a piston slidably mounted in said container between said ports and defining a chamber on each side thereof in communication respectively with said ports, said piston having three longitudinally spaced annular peripheral grooves and a first and second additional annular groove located respectively between the first and second and second and third longitudinally spaced grooves, each of said three longitudinally spaced grooves having a resilient seal ring therein, said piston having two cavities therein and passageways leading from the first additional annular groove into one of said cavities, and from the second additional annular groove into the other of said cavities, said piston having two additional passageways, one of said additional passageways connecting said cavities and the other of said additional passageways connecting the other of said cavities to the chamber in communication with the liquid port, and a one-way valve in each of said additional passageways permitting flow only from said first cavity into the second cavity and from the second cavity into the liquid chamber.

5. The combination set forth in claim 4 in which each of said one-way valves is spring loaded.

6. The combination set forth in claim 4 in which the first of said cavities has a mass of foam rubber therein and in which means are provided in the piston to afford access to said mass of foam rubber.

References Cited in the file of this patent

UNITED STATES PATENTS

| | | |
|---|---|---|
| 2,352,041 | Van Den Berg | June 20, 1944 |
| 2,683,467 | Greer | July 13, 1954 |
| 2,817,361 | Mercier | Dec. 24, 1957 |